United States Patent
Brignone et al.

(10) Patent No.: US 6,817,522 B2
(45) Date of Patent: Nov. 16, 2004

(54) SYSTEM AND METHOD FOR DISTRIBUTED STORAGE MANAGEMENT

(75) Inventors: Cyril Brignone, Mignaloux (FR); Salil Pradhan, Santa Clara, CA (US); Timothy S. Connors, Sunnyvale, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 10/350,530

(22) Filed: Jan. 24, 2003

(65) Prior Publication Data

US 2004/0144842 A1 Jul. 29, 2004

(51) Int. Cl.$^7$ .............................................. G06F 17/60
(52) U.S. Cl. ....................... 235/385; 235/381; 235/383
(58) Field of Search ................................ 235/385, 383, 235/381; 705/22, 28

(56) References Cited

U.S. PATENT DOCUMENTS

| | | | | |
|---|---|---|---|---|
| 4,636,950 A | * | 1/1987 | Caswell et al. | 705/28 |
| 4,673,932 A | * | 6/1987 | Ekchian et al. | 340/10.32 |
| 4,688,026 A | * | 8/1987 | Scribner et al. | 235/385 |
| 5,686,902 A | * | 11/1997 | Reis et al. | 340/10.2 |
| 5,724,261 A | * | 3/1998 | Denny et al. | 702/184 |
| 5,821,513 A | * | 10/1998 | O'Hagan et al. | 235/383 |
| 5,850,416 A | * | 12/1998 | Myer | 375/221 |
| 5,910,776 A | * | 6/1999 | Black | 340/10.1 |
| 5,963,134 A | * | 10/1999 | Bowers et al. | 340/572.1 |
| 6,025,780 A | * | 2/2000 | Bowers et al. | 340/572.3 |
| 6,046,682 A | * | 4/2000 | Zimmerman et al. | 340/825.49 |
| 6,076,023 A | * | 6/2000 | Sato | 700/214 |
| 6,131,812 A | * | 10/2000 | Schneider | 235/385 |
| 6,148,291 A | * | 11/2000 | Radican | 705/28 |
| 6,335,685 B1 | * | 1/2002 | Schrott et al. | 340/572.1 |
| 6,354,493 B1 | * | 3/2002 | Mon | 235/380 |
| 6,512,478 B1 | * | 1/2003 | Chien | 342/357.09 |
| 6,552,663 B2 | * | 4/2003 | Swartzel et al. | 340/572.1 |
| 2003/0069815 A1 | * | 4/2003 | Eisenberg et al. | 705/32 |

FOREIGN PATENT DOCUMENTS

WO     WO 200217537 A2 *  2/2002  .......... G06F/17/00

OTHER PUBLICATIONS

IDTechEx—"Total Asset Visibility" Chapter 3—"System Choices fo Various Forms of TAV" sub chapter 3.4—Smart Shelves pp. 75–83.
IDTechExWebpage—Total Asset Visibility pamphlet pp. 1 & 2—Dec. 6, 2002.
C/Net News.com webpage—Major Retailers to Test "Smart Shelves" by Alorie Gilbert—Jan. 8, 2003—pp. 1–4.
Press Release—May 2001 "Frontline Solutions Magazine"—"Packagers Think Outside the Box—Leaders test RFID for Supply Chain Overhaul"—pp. 1–3.

\* cited by examiner

*Primary Examiner*—Michael G. Lee
*Assistant Examiner*—Uyen-Chau N. Le
(74) *Attorney, Agent, or Firm*—Lloyd E. Dakins, Jr.

(57) ABSTRACT

A system and method is disclosed for distributed storage management. The system discloses: an item storage device, including a set of items: an item identification module, for collecting raw data from the set of items located within the item storage device; a processing module, proximate to the item storage device, for summarizing a predetermined subset of the raw data; a memory module, for storing selected system data; and a communications module, for transmitting the summarized data. The method of the present invention discloses: collecting raw data from a set of items located within an item storage device; summarizing a predetermined subset of the raw data with a processing module proximate to the item storage device; storing selected system data; and transmitting the summarized data.

35 Claims, 5 Drawing Sheets

SYSTEM AND METHOD FOR DISTRIBUTED STORAGE MANAGEMENT

BACKGROUND OF THE INVENTION

1. Field of the Invention

The present invention relates generally to systems and methods for storage management, and more particularly to distributed storage management.

2. Discussion of Background Art

Enterprises which manage substantial inventories, such as retail stores, warehouses, libraries, package delivery firms, as well as many other businesses, often follow standard business processes for managing storage of such inventories. Such processes rely on a large number of individuals who manually locate and identify all of the assets and infrastructure to be inventoried. Such manual processes, even though often augmented with computerized bar code scanners, are fraught with error. Usually gaps remain after such inventorying since not all assets are either found, counted correctly, and/or scanned. For example, due to such inaccurate processes, in many stores, an incredible number of sales are lost due to empty shelves even though the product is available in the back room, or could have been previously ordered from a supplier. There typically has not been a way to monitor the number of products on a shelf without someone having been physically there.

"Smart-shelves" is a phrase coined by industry covering various attempts to increase the accuracy of inventory monitoring and reduce its costs. Smart-shelves employ a system of product tags on products and tag reader devices, connected to a central computer system which monitors the products on a shelf.

Figure 1:
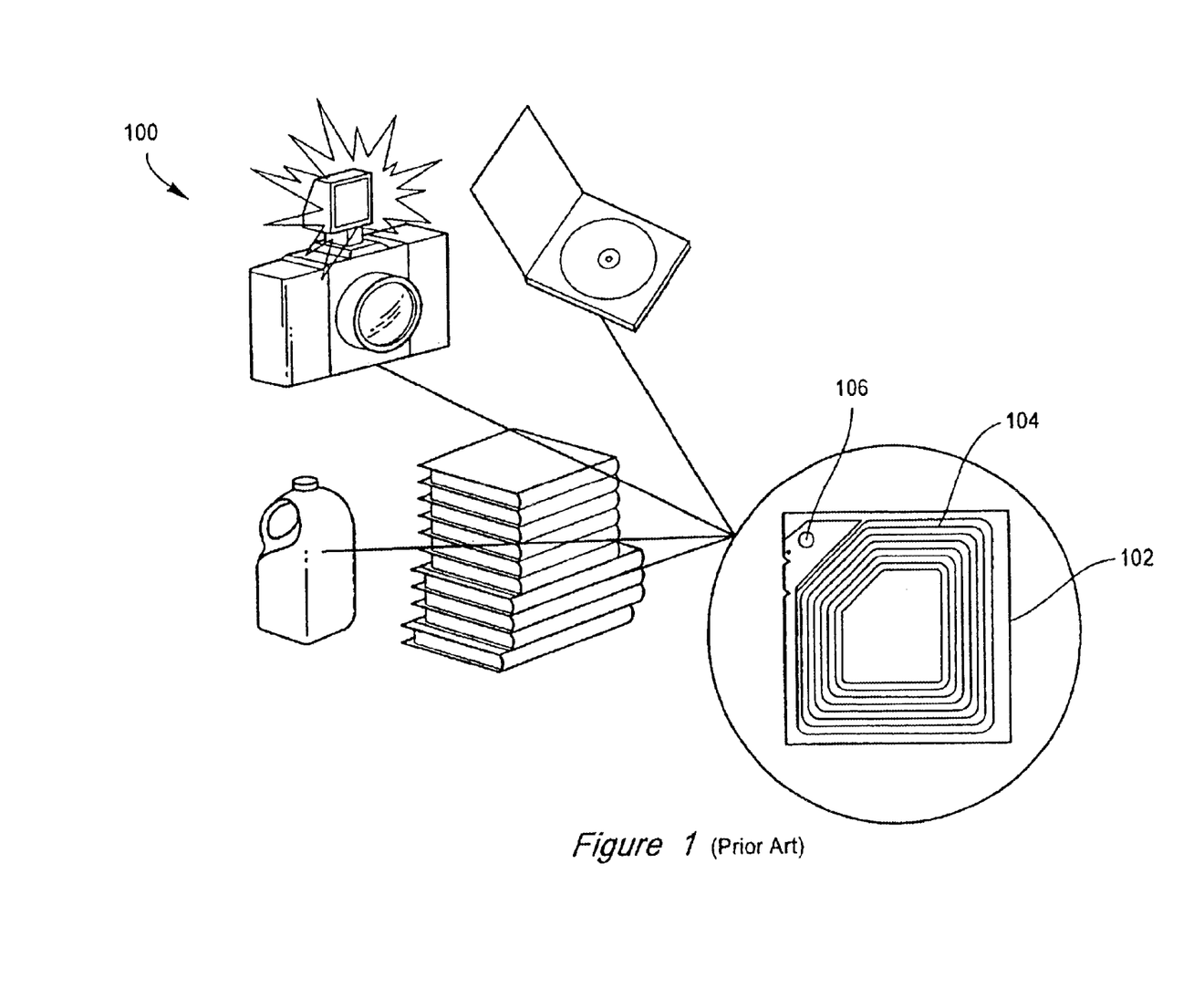
FIG. 1 is a pictorial diagram of a prior art radio frequency identification (RFID) device.

The product tags are typically a Radio Frequency Identification (RFID) tag affixed to a product. FIG. 1 is a pictorial diagram 100 of a typical Radio Frequency Identification (RFID) tag 102. The RFID tag 102 typically includes an inductive antenna 104 and a computer chip 106. RFID tags typically contain product model number and serial number identification information, which may or may not conform to an electronic Product Code (e-PC) protocol format. Currently, RFID tags are commonly used as anti-theft devices in retail stores.

Central computer systems, however, are inundated by the large amounts of data collected by the tag reader devices. Such systems require substantial, and expensive, central computer processing power, yet still operate very slowly, with a high data latency. For example, retail store having thousands of products, require the central computer to individually poll each product's tag for product information in a very piecemeal manner.

In response to the concerns discussed above, what is needed is a system and method for storage management that overcomes the problems of the prior art.

SUMMARY OF THE INVENTION

The present invention is a system and method for distributed storage management. The system of the present invention includes: an item storage device, including a set of items: an item identification module, for collecting raw data from the set of items located within the item storage device; a processing module, proximate to the item storage device, for summarizing a predetermined subset of the raw data; a memory module, for storing selected system data; and a communications module, for transmitting the summarized data.

The method of the present invention includes: collecting raw data from a set of items located within an item storage device; summarizing a predetermined subset of the raw data with a processing module proximate to the item storage device; storing selected system data; and transmitting the summarized data.

These and other aspects of the invention will be recognized by those skilled in the art upon review of the detailed description, drawings, and claims set forth below.

DETAILED DESCRIPTION OF THE PREFERRED EMBODIMENT

The present invention is a distributed storage management system and method for enterprises which manage substantial inventories. Such inventories may include: items, shelves, and freezers within a retail store; equipment, parts, and files within a warehouse; books, maps, and papers within a library; customer packages within a delivery firm, as well as many other items within many other businesses.

The present invention leverages the capabilities of distributed, location-aware sensor networks, and so transforms conventional enterprise inventories into efficient, secure, self-regulating and self-managed environments. Using such a system and method, real-time data mining on current and historic storage information is also practicable.

In a typical installation, multiple instances of the present invention are distributed over a geographic area. The present invention's distributed processing nature enables large amounts of storage data to be collected and processed in-situ so as to provide value added information to users and central servers, which requires less communication bandwidth than traditional systems which collect and receive only raw data. By decreasing the required bandwidth, data can be communicated wirelessly, further reducing cost and increasing scalability, as compared to centralized hardwired systems.

The present invention is discussed below primarily in reference to a retail store having a plurality of item storage devices, such as multi-shelf units, freezers, and the like, having a plurality of item storage areas for hosting a plurality of items, such as retail goods, for sale. However those skilled in the art will recognize that the systems and methods described can be analogously applied to any storage application, such as, but not limited to, those listed at the beginning of this section.

In the exemplary retail store embodiment of the present invention, the present invention includes both a set of hardware (a.k.a. an storage manager) associated with each discrete item storage device, and a method by which such item storage devices communicate with each other and with other dedicated computers over a network.

Figure 2A:
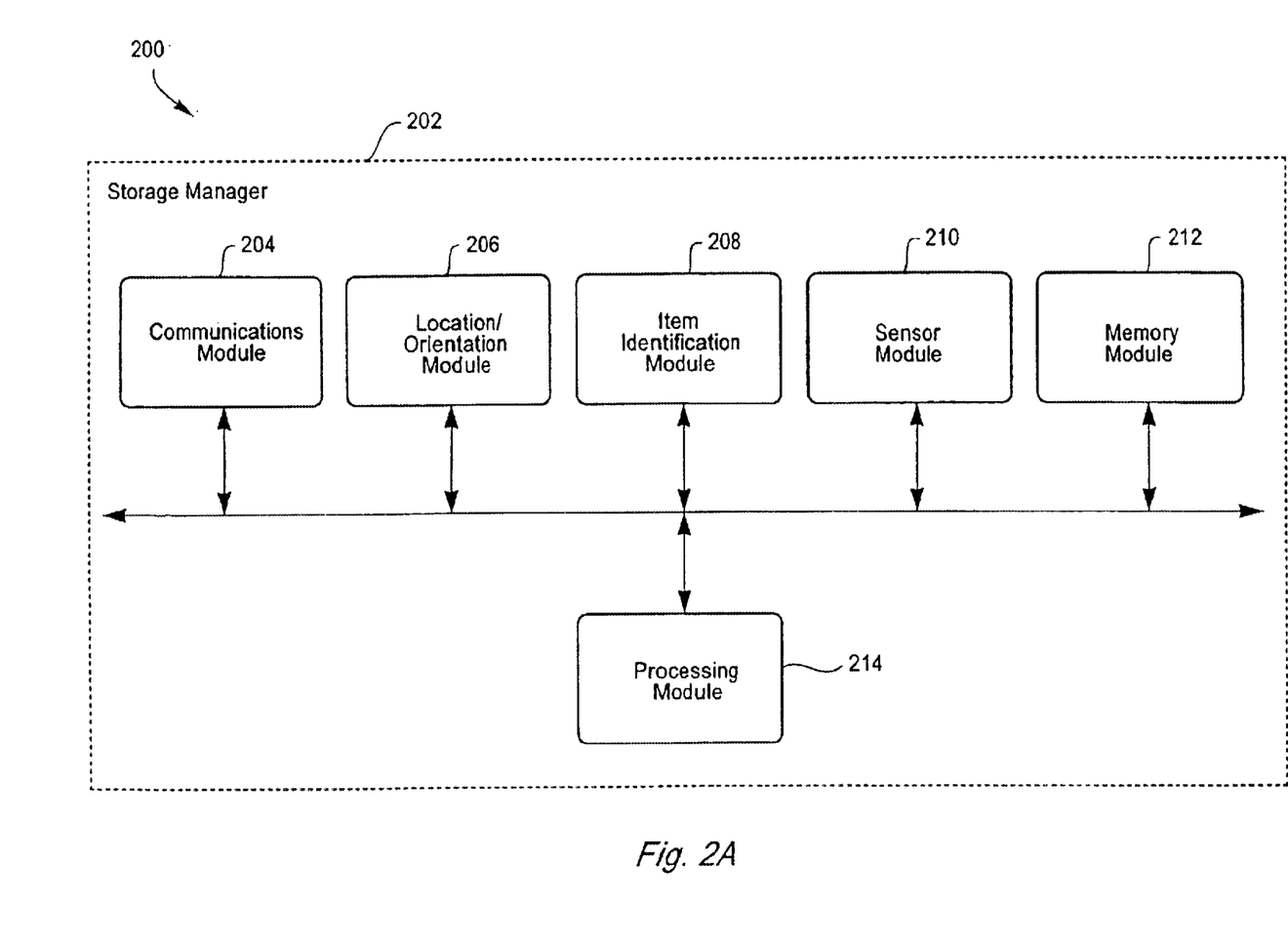
FIG. 2A is a block diagram of one embodiment of an storage manager within a system for distributed storage management.

FIG. 2A is a block diagram of one embodiment 200 of an storage manager 202 within a system for distributed storage management. The storage manager 202 associated with each item storage device preferably includes a communications module 204, a location/orientation module 206, an item identification module 208, a sensor module 210, a memory module 212, and a processing module 214. Each of the modules are connected using a common bus architecture. In communication with the storage manager 202, but not shown however, are a variety of other information accessing and providing devices, including but not limited to a set of mobile computing devices, and computers, including perhaps a central computer.

The communications module 204, provides wireless communications resources to the storage manager 202. Note that in alternate embodiments of the present invention the storage managers on the item storage devices may be connected using a hardwired network. Wireless networks are preferred due to their reduced infrastructure costs and due to the distributed computational nature of the present invention's, which requires only low-bandwidth communication rates.

The location/orientation module 206, in some embodiments, is tightly integrated with the communications module 204, and preferably includes at least two location sensing devices. The location sensing devices can determine an item storage device's location and orientation using a variety of different technologies, such as global positioning systems, magnetic compasses, local signal strength triangulation techniques, and/or ultra sound signals. Only one location sensing device, however, is necessary to locate the item storage device within a common store coordinate system. The second location sensing device, or perhaps a separate orientation sensing device (such as a compass) determines the item storage device's orientation with respect to that coordinate system.

The item identification module's 208 function is to identify all items located within each individual storage area within the item storage device. Each item within an item storage area has an associated identification tag. The identification tag can have a design incorporating a variety of technologies, including Radio Frequency Identification (RFID) tag technology, which may or may not conform to an electronic Product Code (e-PC) protocol format.

Figure 2B:
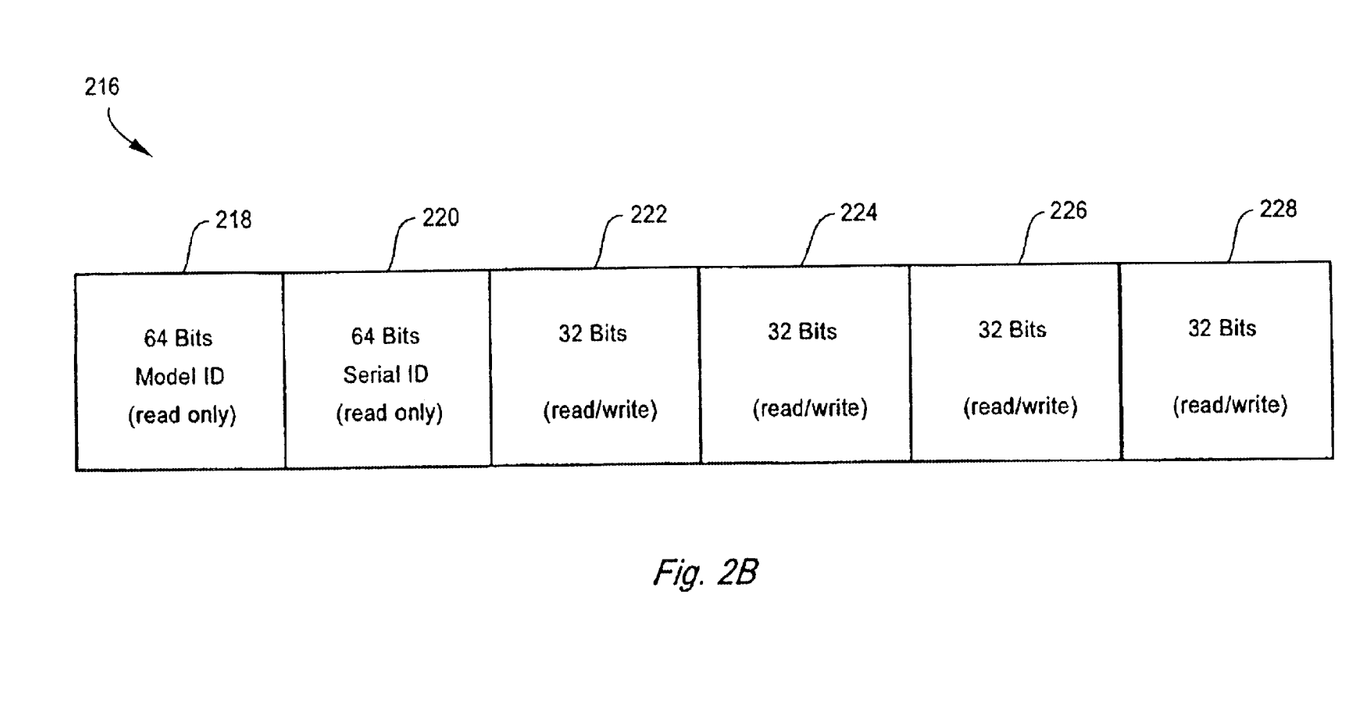
FIG. 2B is a preferred identification tag data structure.

FIG. 2B is a preferred identification tag data structure 216. One embodiment of the data structure 216 could have 256 bits of memory. 128 bits could be read only and used for product description data, including a 64 bit Model-ID 218 and a 64 bit Serial-ID 220. Another 128 bits, 222 through 228, could be read-write and be available for storing additional information in the RFID tag, such as a set of item locations. The Model-ID identifies a particular item for sale, and is akin to a "model number," whereas the Serial-ID corresponds to each unique instantiation of the item, and is akin to a "serial number."

The identification module 208 includes an item identification tag reader embedded within each shelf. The reader enables the identification module 208 to determine which items are on the shelf by scanning the shelf for item identification tags. The reader preferably reads an item's Model-ID, Serial-ID, and a set of previous item locations. After scanning the shelf, the reader then preferably stores a current item location and time tag in each item's identification tag. The availability of the set of previous item locations enables misplaced items to be re-stocked, and consumer store behavior to be analyzed.

Because there are typically multiple items on each shelf, the identification module 208 uses anti-collision techniques which enable the reader to receive data from each tag one after each other.

The sensor module 210, preferably includes a custom set of sensors selected to preserve the freshness, stability, and/or whatever other parameters are deemed important with respect to the items on each of the shelves.

The memory module 212 preferably can store several Gigabytes of information collected and generated by the various modules within the storage manager 202. Depending upon the present invention's application, enough memory may need to be included so that a complete history of all events associated from the time that item storage device was first turned on until an end of useful life is reached. For instance, information stored may include, identification, location, and timestamps for each item storage device, item storage area, and each item currently on or which has been removed from each shelf. In operation, the policy loaded into the storage manager and executed by the processing module 214 determines what exact information is stored in the memory module 212.

The memory module 212 is located sufficiently proximate to the item storage device, at a predetermined distance from the item storage device, limited only by the memory module's 212 ability to efficiently store data related to the item storage device. Preferably, however, the memory module 212 is physically attached to the item storage device.

The processing module 214, is the focal point for all of the other modules 204 through 212, and implements various policies/software programs which have either been pre-loaded into the memory 212 during manufacture, or set-up, and/or received via the communications module 204 from other storage managers 202, a central computer, a mobile computing device, or some other device. Policies loaded into the storage managers 202 can differ from storage manager to storage manager.

The processing module 214 is located sufficiently proximate to the item storage device, at a predetermined distance from the item storage device, limited only by the processing module's 214 ability to efficiently process the raw data. Preferably, however, the processing module 214 is physically attached to the item storage device.

The processing module 214 enables each of the storage managers 202 to pre-process and/or summarize a significant amount of raw data received from the other modules 204 through 212 in a distributed way so that a more refined set of high-level data can be either communicated between the various storage managers 202, a set of mobile computing devices, or the central computer. Such pre-processed/summarized data requires significantly less communications bandwidth than would otherwise be needed if the raw data had to be transmitted. Operation of the storage manager 202 and execution of various policies therein is discussed with respect to FIG. 3.

As alluded to above, the present invention is contemplated to operate under the guidance of a systems administrator and/or users operating from a variety devices networked with the storage managers 202, such as one or more computers, including perhaps a central computer, and a set of mobile computing devices. These systems administrators and users can generate queries, program the storage managers 202 with various policies, and receive alarms and out-of-stock alerts.

Figure 3:
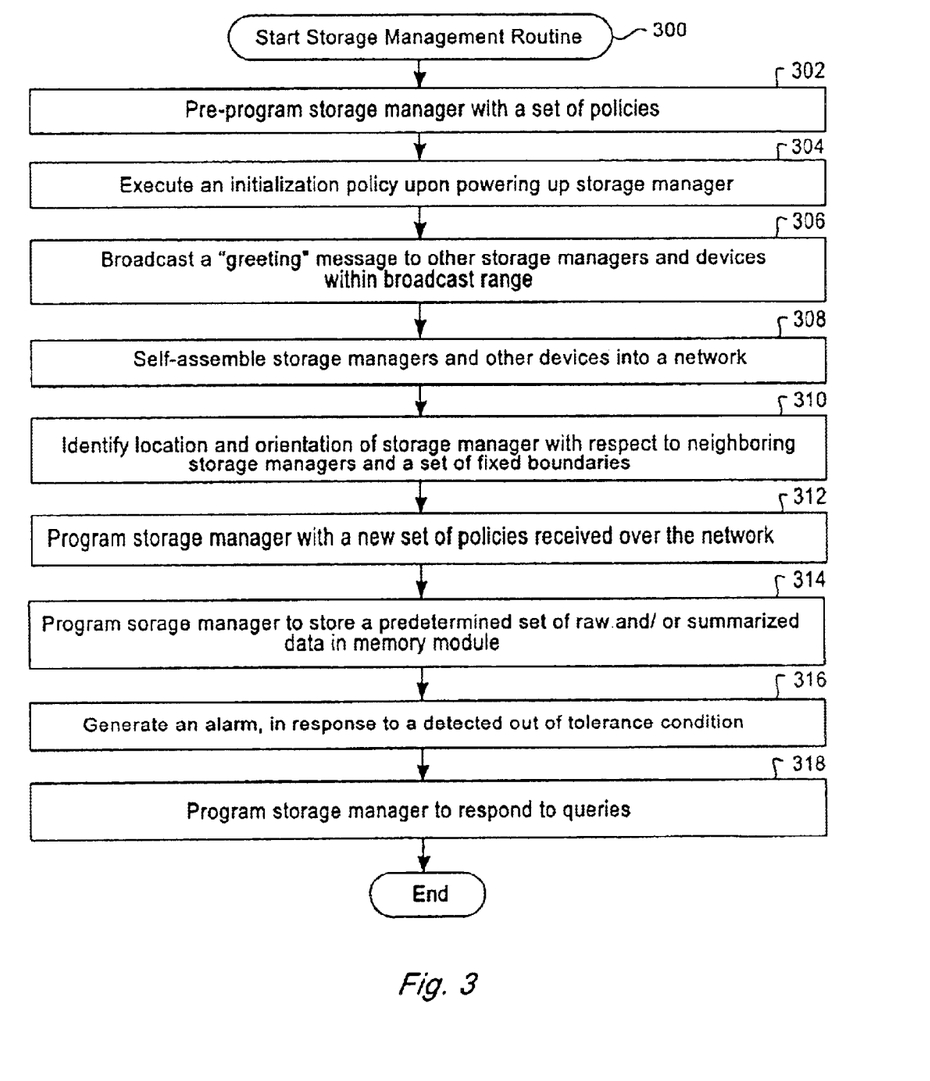
FIG. 3 is a flowchart of one embodiment of a method of distributed storage management.

FIG. 3 is a flowchart of one embodiment of a method of distributed storage management 300. To begin in step 302, the storage manager 202 is pre-programmed with a set of policies, including an "initialization policy." Policies are herein defined as software programs loaded into the storage manager 202 memory module 212 and executed by the processing module 214, thereby generating a predetermined set of responses to a predetermined set of events detected by any of the modules 204 through 212. In step 304, the manager 202 executes the initialization policy upon powering up the storage manager 202.

In step 306, the storage manager 202 broadcasts a "greeting" message, using the communications module 204. The greeting is initially received by other storage managers, mobile devices, and the central computers if they are within broadcast range. However, once the greeting is received by one network device, it is also passed to all other network devices already in communication with that one network device. Thus all members of the network, via node hopping or an equivalent, will preferably receive the greeting.

In step 308, the storage managers 202, mobile devices, the central computer, and other supporting devices self-assemble themselves into a network, based on received responses to the greeting message. Preferably, the network permits the storage managers to interact in either a client-server mode or a peer-to-peer mode.

Next in step 310, the storage manager 202 uses the location and orientation module 206 to identify a location and orientation of the storage manager 202 with respect to neighboring storage managers and a set of fixed boundaries. The fixed boundaries preferably identify a floor area (e.g. store space) within which the storage manager 202 is located. Each storage manager directly communicates with neighboring storage managers so as to compute each of their respective locations and orientations.

In step 312, the storage manager 202 is programmed with a next set of policies received over the network, such as from the central computer, a different storage manager, or a mobile device. Next in step 314, the storage manager 202 is programmed to store a predetermined set of raw and/or summarized data in the memory module 212. For example, the storage manager 202 preferably monitors and records, in the memory module 212, a Model-ID, a Serial-ID, a time tag, a current location, and a set of previous locations for each item detected by the item identification module 208.

In step 316, the storage manager 202 is programmed to generate an alarm, in response to an out of tolerance condition detected in one of the modules 204 through 212. For example, an alarm can be generated when: the sensor module 210 detects a storage manager shelf temperature which is either too high or too low; the item identification module 208 determines that a specific item Model-ID and/or Serial-ID is no longer on a set of storage manager shelves.

In step 318, the storage manager 202 is programmed to respond to queries. Queries are data mining commands, and can be sent by the central computer, a neighboring storage manager, a mobile device, or some other device connected to the network. Queries may include, for example: requesting each storage manager to report their respective location and orientation so that a map of all storage managers within a predetermined boundary can be automatically generated; requesting each storage manager to report their respective item inventory so that an inventory of all items within a predetermined boundary can be automatically generated; requesting that storage managers report on all items having a specific Model-ID within their respective item storage devices; and requesting that a storage manager, report on a specific Serial-ID within their respective item storage device; and requesting that storage managers, report on a total time a set of items spend at a particular location within their respective item storage device.

Figure 4:
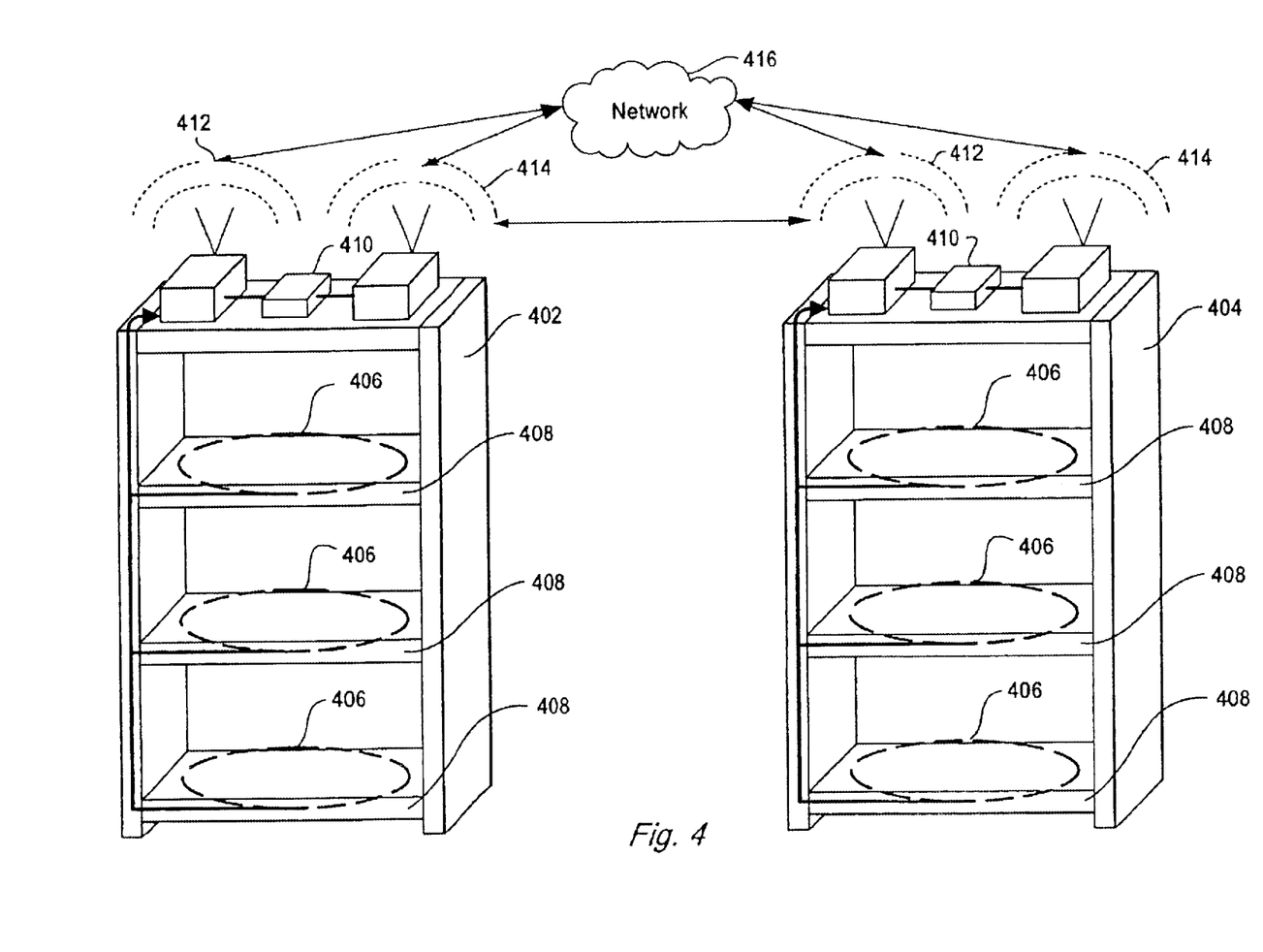
FIG. 4 is a pictorial diagram of one embodiment of the system for distributed storage management.

FIG. 4 is a pictorial diagram of one embodiment 400 of the system for distributed storage management. In this exemplary embodiment, the storage managers are affixed to a set of multi-shelf units (a.k.a. item storage devices) 402 and 404. Each multi-shelf unit 402 and 404 includes a RFID reader 406 underneath each shelf storage area 408. The RFID reader 406 forms a first part of the item identification module 208. The multi-shelf units 402 and 404 also include a memory module 410 and a first and second combination module 412 and 414. In one embodiment, each of the combination modules 412 and 414 are redundant and both include the communications module 204, the location/orientation module 206, a second part of the item identification module 208, and the sensor module 210. However, those skilled in the art will recognize that the modules 204 through 214 can be apportioned in any manner between the first and second combination modules 412 and 414, except that portions of the communication module 204 should be located in both combination modules 412 and 414 so that the store rack's orientation can be determined.

As shown, the multi-shelf units 402 and 404 are preferably connected to a network so that data can be shared and transmitted with other devices connected to the network. For instance, a person could carry a handheld mobile computing device through out the physical space housing the item storage devices, sending out queries and receiving requested information.

While one or more embodiments of the present invention have been described, those skilled in the art will recognize that various modifications may be made. Variations upon and modifications to these embodiments are provided by the present invention, which is limited only by the following claims.

What is claimed is:

1. A system for storage management, comprising:
   a storage manager situated at a fixed location with respect to an item storage device that includes a set of items, the storage manager comprising:
   an item identification module, for collecting raw data from the set of items, located within the item storage device;
   a processing module, physically attached to the item storage device, for summarizing a predetermined subset of the raw data;
   a memory module, for storing selected system data, physically attached to the item storage device;
   a first sensing device for determining the item storage device's current location within a predefined coordinate system; and
   a communication module for transmitting the summarized data and the storage device's current location.

2. The system of claim 1, wherein:
   the item identification module further includes a tag reader for scanning the item storage device for a set of item tags.

3. The system of claim 2 wherein:
   the set of item tags include a current item location and a previous item location.

4. The system of claim 1, wherein:
   the item identification module further includes a RFID tag reader for scanning the item storage device for a set of RFID tags.

5. The system of claim 1, wherein the communications module includes a wireless communication device.

6. The system of claim 1, further comprising:
   a second sensing device operating in conjunction with the first sensing device for determining the item storage device's current orientation with respect to the predefined coordinate system.

7. The system of claim 1, further comprising:
a set of sensors selected to monitor a set of environmental parameters affecting the set of items.

8. The system of claim 1, wherein the memory module stores selected raw data.

9. The system of claim 1, wherein the memory module stores selected summarized data.

10. A method of storage management, comprising:
collecting raw data with a storage manager, from a set of items while the set of items are located within an item storage device, using an item identification module located within the item storage device;
summarizing, with the storage manager, a predetermined subset of the raw data with a processing module physically attached to the item storage device;
storing, with the storage manager, selected system data in a memory module physically attached to the item storage device; and
transmitting, with the storage manager, the summarized data to a remote location and a greeting message to other storage managers.

11. The method of claim 10, further comprising:
self-assembling the storage manager and the other storage managers into a network, based on responses to the greeting message.

12. The method of claim 10, further comprising:
affixing the storage manager to a permanent location;
identifying, with the storage manager, the permanent location of the storage manager with respect to a predefined coordinate system.

13. The method of claim 10 further comprising:
affixing the storage manager to a permanent location;
transmitting, with another storage manager, a query to the storage manager;
transmitting data directly from the storage manager to the another storage manager in to respond to the query of the another storage manager.

14. A system for storage management, comprising:
a plurality of storage managers distributed at fixed locations over a geographical area, each storage manager comprising:
an identification module for identifying identification tags within an area of the storage module;
a processing module for processing data from the identification module;
a memory module for storing the processed data; and
a communication module for communicating with a computer and for directly communicating and exchanging data with other storage managers within the geographical area.

15. The system of claim 14 wherein the plurality of storage managers are connected to a network, and each storage manager is programmed to respond to queries wirelessly transmitted from the central computer, from another storage manager in the geographical area, and from a mobile device.

16. The system of claim 15 wherein the queries include requesting a storage manager to report its respective location within the geographical area.

17. The system of claim 15 wherein the queries include requesting a storage manager to report an inventory of identification tags located within an area of the storage manager.

18. The system of claim 15 wherein the queries include requesting a storage manager to report an inventory of identification tags having a specific model-identification or serial identification within an area of the storage manager.

19. The system of claim 15 wherein the queries include requesting a storage manager to report an amount of time that an identification tag spent at a particular location with an area of the storage manager.

20. The system of claim 14 wherein each storage manager communicates with other storage managers in the geographical area and the central computer to self-assemble themselves into a network.

21. The system of claim 20 wherein the network enables the plurality of storage managers to interact in at least one of a client-server mode and a peer-to-peer mode.

22. The system of claim 14 wherein each storage manager:
includes a location module for identifying a location of itself with respect to other storage managers in the geographical area; and
wirelessly communicates, via the communication module, the location of itself to the central computer.

23. The system of claim 14 wherein a storage manager directly communicates with other storage managers to compute its location.

24. The system of claim 14 wherein each storage module:
comprises a sensor module for sensing temperature within an area of the storage module; and
automatically communicates, via the communication module, an alarm to the central computer if the temperature within the area of the storage manager exceeds a threshold.

25. A method for managing an inventory comprising:
assembling, at fixed locations within a geographical area, plural storage devices into a network;
scanning, with the plural storage devices, identification tags located within areas proximate to the plural storage devices;
processing, with the plural storage devices, data from the scanning of the identification tags;
storing, in the plural storage devices, processed data from the processing data from the scanning of the identification tags;
exchanging data directly from one storage device to another storage device; and
communicating the processed data from the plural storage devices to a computer.

26. The method of claim 25 further comprising:
determining, by a storage device, a location of the storage device; and
transmitting, via wireless communication by the storage device, the location of the storage device directly to other storage devices.

27. The method of claim 25 further comprising:
identifying, with the plural storage devices, inventory that has been removed from locations within the areas proximate to the plural storage devices;
identifying, with the plural storage devices, locations of inventory within the areas proximate to the plural storage devices; and
transmitting, by the plural storage devices, to at least one of a mobile computer and the computer data of the inventory and the locations.

28. The method of claim 25 wherein communicating the processed data further comprises wirelessly transmitting the processed data through a network to the computer.

29. The method of claim 25 further comprising the plural storage devices directly communicating with each other to self-assemble themselves into a network.

30. The method of claim 25 wherein exchanging data directly from one storage device to another storage device further comprises at least two storage devices exchanging data to compute a location of at least one of the storage devices.

31. The method of claim 25 further comprising:
sensing, by the plural storage devices, movement of identification tags located within areas proximate to the plural storage devices;
storing data associated with sensing movement of identification tags;
identifying, by scanning with the plural storage devices, an inventory of items currently located within areas proximate to the plural storage devices;
storing data associated with the inventory of items; and
transmitting, via a wireless network, the data associated with sensing and the data associated with the inventory to the computer.

32. The method of claim 25 wherein exchanging data directly from one storage device to another storage device further comprises a first storage device directly responding to a second storage device when the second storage device sends a query to the first storage device.

33. The method of claim 25 wherein exchanging data directly from one storage device to another storage device further comprises a first storage device directly sending a second storage device data regarding a location of the first storage device.

34. The method of claim 25 wherein exchanging data directly from one storage device to another storage device further comprises a first storage device directly sending a greeting to a second storage device.

35. The method of claim 25 wherein scanning includes scanning the identification tags while the identification tags are stationary to identify all identification tags currently within or previously removed from areas proximate to the plural storage devices.

* * * * *